(12) United States Patent
Timbrell (10) Patent No.: US 9,954,350 B2
(45) Date of Patent: Apr. 24, 2018

(54) SUPPORTING APPARATUS FOR CONDUCTORS

(71) Applicant: Preformed Line Products, Mayfield Village, OH (US)

(72) Inventor: Philip Kenneth Timbrell, Mount Riverview (AU)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 14/594,449

(22) Filed: Jan. 12, 2015

(65) Prior Publication Data

US 2015/0122538 A1   May 7, 2015

Related U.S. Application Data

(63) Continuation of application No. PCT/AU2013/000756, filed on Jul. 10, 2013.

(30) Foreign Application Priority Data

Jul. 12, 2012   (AU) ................ 2012902989

(51) Int. Cl.
   *H02G 7/02*   (2006.01)
   *H02G 7/04*   (2006.01)

(52) U.S. Cl.
   CPC ............... *H02G 7/02* (2013.01); *H02G 7/04* (2013.01); *Y10T 29/49609* (2015.01)

(58) Field of Classification Search
   CPC .................................. H02G 7/02; H02G 7/04
   See application file for complete search history.

(56) References Cited

U.S. PATENT DOCUMENTS

| 2,172,810 A | * | 9/1939 | Sherman | H02G 7/14 174/173 |
| 2,744,707 A | | 5/1956 | Peterson | |
| 3,183,658 A | | 5/1965 | Peterson | |
| 3,899,629 A | | 8/1975 | Hawkins | |
| 4,620,059 A | | 10/1986 | Sherman | |
| 6,372,984 B1 | * | 4/2002 | Wang | H02G 7/14 174/40 TD |

FOREIGN PATENT DOCUMENTS

| CN | 2850084 Y | 12/2006 |
| CN | 201011701 Y | 1/2008 |
| CN | 101697408 A | 4/2010 |

OTHER PUBLICATIONS

Int. Search Report/Written Opinion cited in PCT Application No. PCT/US2013/000756 dated Sep. 15, 2013, 14 pgs.
Int. Preliminary Report cited in PCT Application No. PCT/US2013/000756 dated Nov. 6, 2014, 65 pgs.

(Continued)

*Primary Examiner* — William H Mayo, III
*Assistant Examiner* — Hiram E Gonzalez
(74) *Attorney, Agent, or Firm* — Cooper Legal Group, LLC (57) ABSTRACT

A supporting apparatus for a conductor, comprising a helical rod having a plurality of turns. The pitch between the turns varies along the length of the helical rod, from a region of longer pitch at an end of the helical rod to a region of shorter pitch along the rod.

8 Claims, 5 Drawing Sheets

(56) References Cited

OTHER PUBLICATIONS

Reply Written Opinion cited in PCT Application No. PCT/US2013/000756 dated Sep. 1, 2014, 30 pgs.
Australian Examination Report cited in Australian Application No. 2013289848 dated Nov. 29, 2016, 5 pgs.
First Chinese Office Action cited in Chinese Application No. 201380037052.X dated Sep. 2, 2016, 16 pgs.
Second Chinese Office Action cited in Chinese Application No. 201380037052.X dated May 3, 2017, 14 pgs.
Third Chinese Office Action in Chinese Application No. 201380037052.X dated Nov. 27, 2017, 6 pgs.

* cited by examiner

VARYING PITCH SHORT SPLICE ACTING IN UNISON WITH EITHER CONVENTIONAL OR VARYING PITCH DEAD END)

figure 10.

SUPPORTING APPARATUS FOR CONDUCTORS

RELATED APPLICATIONS

This application claims priority to and is a continuation of PCT application No. PCT/AU2013/000756, titled "SUPPORTING APPARATUS FOR CONDUCTORS", filed Jul. 10, 2013, which claims priority to AU application No. AU 2012902989, titled "SUPPORTING APPARATUS FOR CONDUCTORS" filed Jul. 12, 2012. PCT application No. PCT/AU2013/000756 and AU application No. AU 2012902989 are incorporated herein by reference.

FIELD OF DISCLOSURE

This disclosure relates to a supporting apparatus for conductors, and, particularly, but not exclusively, to a helical support apparatus for electric power transmission conductors and distribution conductors and other similar conductors and cables.

BACKGROUND

It is known to use support apparatus in the form of helical rods ("helicals") for supporting and reinforcing electrical power transmission conductors. Helicals are used to form a number of different devices to carry out different supporting applications for conductors.

For example, helical dead-ends are used to support a conductor where there is an unbalanced mechanical load. Helicals are also used to splice together ends of conductors. Helical ties and side ties are used to attach a conductor to an insulator, and often consist of a single rod or a pair of helical rods. Spacers are used to separate conductors of the same voltage and may also consist of one helical rod or a subset or a set of helical rods. Armour rods are used to reinforce a conductor where it is connected (e.g. suspended) relative to a power or tower to avoid a stress riser being created at the area where the conductor is suspended. Other products for support, reinforcement, and protection of conductors are also produced using helicals.

There are a number of parameters associated with the quality of performance of a helical. These include coefficient of friction between the rod and conductor, angle of crossover (e.g. where helicals are used in dead-end applications); the springiness or hardness of the raw material from which the rods are made; whether the rods are glued together into subsets or sets, or applied individually; the pitch angle of the helical turns; the packing density; the length of each pitch; rod diameter; number of pitches, and compression ratio (the ratio of the internal diameter of the rod before application, to the external diameter of the conductor to which the rod is to be fitted). It is common practice for the purpose of ease of manufacture and simplicity of design to keep these parameters constant within each fitting.

Some helical devices have been made with variation in some parameters. For example, U.S. Pat. No. 2,172,810 discloses an armour rod with a narrower pitch at the ends of the rod than at the centre, which is said to promote greater flexibility at the ends. U.S. Pat. No. 3,899,629 discloses a helical fitting where the ends of the helical fitting have a longer pitch than the rest of the helical fitting, in order to allow the helical to be more easily installed on the conductor. The present Applicants believe that by manipulating the performance parameters associated with a helical rod, better, more efficient, support apparatus can be provided.

SUMMARY

According to a first aspect of the present invention there is provided a supporting apparatus for a conductor, comprising a helical manufactured with a plurality of turns arranged for gripping the conductor, the pitch between the turns varying along the length of the helical, from a region of longer pitch at an end of the helical to a region of shorter pitch along the helical, and the internal diameter of the turns varying along the helical whereby to vary compression ratio, whereby the varying pitch and diameter of the turns results in variations in gripping force along the helical when applied to the conductor.

In an embodiment the pitch of the turns varies along the helical from one end having a region of longer pitch, to a region of shorter pitch, to a region of longer pitch again.

In an embodiment the helical has four or more regions of pitch, the pitch varying from longer, to shorter, to longer, to shorter.

In an embodiment the pitch of the helical is longer at one end, then shorter, then longer, then shorter, then longer, forming five regions of pitch.

In an embodiment the pitches within the regions of shorter pitch and longer pitch are generally constant.

In an embodiment transition regions are located between regions of shorter pitch and regions of longer pitch, the transition region having a length of the order half a pitch length and the pitch within the transition region varying from the pitch of the shorter region to the pitch of the longer region. In an embodiment a middle region of the apparatus has a longer pitch and the changes in pitch towards both ends from the middle region is generally symmetrical about the middle region.

In an embodiment the compression ratio varies in dependence on length of pitch.

In an embodiment the compression ratio in region of shorter pitch is higher than that in a region of longer pitch.

In an embodiment the compression ratio varies between 0.77 and 1.00.

In an embodiment the diameter of the helical varies along the helical.

In an embodiment the apparatus is a helical dead-end, armour rod, conductor splice, spacer, top tie, or side tie.

In accordance with a second aspect, the present invention provides a supporting apparatus for a conductor, comprising a helical having a plurality of turns, the pitch between the turns gradually varying along the length of the helical rod, from a longer pitch at an end of the helical rod to a shorter pitch along the rod.

It is an advantage of at least an embodiment of this invention, that the longer pitch at the end of the rod allows leverage for ease of installation. The shorter pitch along the length of the rod allows for more gripping and protection on the conductor where required. This also has the advantage of requiring less material to provide the same holding force than for an equivalent conventional rod where the pitch is even between the turns. The gradually lengthening pitch towards the end of the rod reduces the chances of stress arising at points along the conductor where the rod is installed.

In an embodiment, the pitch of the helical rod varies along the rod from one end where the pitch is longer, to a region of shorter pitch, to a region of longer pitch again. This embodiment therefore has at least three regions of pitch (longer, shorter, and longer).

In an embodiment, the supporting apparatus has four or more regions of pitch, whereby the pitch varies from longer, to shorter, to longer, to shorter. In one embodiment, the pitch is longer at one end, then shorter, then longer, then shorter, then longer (five regions). The pitch varies gradually along the length of the helical. The gradual variation of the pitch has the advantage that it reduces the chances of stress arising in the conductor as the pitch changes. Applicants believe that if pitch changes quickly, then there is more likelihood of stress arising in the conductor where the helical is installed. In embodiments, a region of the helical may have constant pitch, it then may gradually change to another region of constant pitch (different from the first region of constant pitch), and so on. In other embodiments, pitch may vary continuously along the length of the rod.

In an embodiment, the internal diameter of the helical varies along its length, whereby to vary the compression ratio. In one embodiment, the internal diameter is greater where the pitch is shorter and less where the pitch is longer. In this embodiment, the compression ratio is therefore greater where the pitch is shorter and less where the pitch is longer. In an embodiment, compression ratio is between 0.70 and 1.00, preferably between 0.77 and 0.98.

It is an advantage of at least an embodiment of the present application that pitch and/or compression ratio are varied to apply strength and protection to a conductor where it is required.

In the embodiment where there is a gradual change of pitch and/or compression ratio, this advantageously avoids undue mechanical stress on the conductor.

In an embodiment, the supporting apparatus is a helical dead-end, armour rod, conductor splice, spacer, top tie, or side tie.

In accordance with a third aspect, the present invention provides a supporting apparatus for a conductor, comprising a helical having a plurality of turns, pitch between the turns varying along the length of the rod, to form four or more regions of different pitch.

In an embodiment, there are five regions of different pitch. In an embodiment, the five regions of different pitch comprise, from one end of the device, a region of pitch of longer length, then a region of pitch of shorter length, then a region of pitch of longer length then a region of pitch of shorter length, then a region of pitch of longer length.

In an embodiment, the supporting apparatus is a conductor splice for supporting a conductor join.

In an embodiment, the supporting apparatus is a conductor dead-end, an armour rod, a top tie or side tie, or a spacer.

In accordance with the fourth aspect, the present invention provides a supporting apparatus for a conductor, comprising a helical having a plurality of turns, the pitch between the turns varying along the length of the device.

In embodiments, the pitch between the turns gradually varies. Gradual variation of the pitch has the advantage that it reduces the chances of stress arising in the conductor as the pitch changes. In embodiments, a region of constant pitch may gradually change to another region of constant pitch (different from the first region's pitch) and so on. In other embodiments, the pitch may continuously and gradually vary along the length of the device.

In an embodiment, the pitch in the centre is longer than the pitch of portions adjacent to the centre. In an embodiment the pitch at the ends is longer than the pitch of adjacent portions.

In an embodiment, the compression ratio of the apparatus also continuously varies along the length of the device.

In an embodiment, the apparatus is a splice, a helical dead-end, a side tie, a top tie, a spacer or an armour rod.

In accordance with a fifth aspect, the present invention provides a supporting apparatus for a conductor, comprising a helical, wherein two or more of the following parameters are varied over the length of the apparatus: Springiness or hardness of the raw material of the helical; Pitch angle; Packing density of a plurality of the helicals; Length of pitch; or Compression ratio.

In an embodiment, pitch and compression ratio are varied along the length of the helical.

The Applicants have also found that, as well as the embodiments of the invention discussed above, it is possible to facilitate operation of a conductor supporting apparatus, such as a helical, by using a further device together with the supporting apparatus. In an embodiment, the further device may be a wedge device providing a wedge function. In an embodiment, the further device may be another supporting apparatus.

For example, in a helical dead-end device, a further helical portion may be placed underneath the part of the helical dead-end where the helical dead-end unwinds to form a loop. This further helical portion therefore provides extra thickness of the conductor at the part where the dead-end connects to the loop. The helical dead-end is wound over the further helical portion and, in use, will close on the further helical portion. This provides a tighter hold on the conductor at this point and prevents slippage of the helical dead-end. Less raw material may be required for the helical dead-end device.

Such a wedge device may be used for any of the helical dead-end, side tie, top tie, splice, or spacer.

Such a wedge device may be used with embodiments of any of the aspects of the invention discussed above.

In a further embodiment, a wedge device may be used with a conventional helical support apparatus.

In accordance with a sixth aspect of the present invention, there is provided a supporting apparatus for a conductor, comprising a helical and a further device arranged in use to mechanically interfere with the helical to facilitate functionality of the supporting apparatus.

In an embodiment, the further device operates as a wedge. In an embodiment, the further device is a further helical which may be wound on the conductor underneath the helical.

In accordance with a seventh aspect, the present invention provides a method of forming a supporting apparatus for a conductor, comprising using a helical to support a conductor, in conjunction with a wedge device.

In an embodiment, the wedge device is a further helical rod.

In an embodiment, the method comprises the steps of winding the further helical rod on the conductor followed by positioning the helical rod over at least a portion of the further helical rod.

In accordance with an eighth aspect, the present invention provides a method of manufacturing a helical support apparatus for a conductor, comprising the steps of varying one or more of the following parameters in the formation of the helical:

Springiness or hardness of the raw material of the helical; Pitch angle of turn; Packing density of plurality of the helicals; Length of pitch; or Compression ratio.

In another embodiment, the step is carried out utilising a spring making machine.

In an embodiment, the spring making machine is a numerically controlled spring making machine.

In an embodiment, this step can be carried out using a rotating mandrel with a varying feed rate.

In accordance with a ninth aspect, the present invention provides a method of manufacturing a helical support apparatus for a conductor comprising the step of forming a length of material into a helical having regions of varying pitch using a numerically controlled spring making machine.

In accordance with a tenth aspect, the present invention provides a transmission line conductor and supporting apparatus assembly, the supporting apparatus being in accordance with the supporting apparatus of above defined aspects of the invention, the supporting apparatus being applied to support the transmission line conductor.

BRIEF DESCRIPTION OF THE FIGURES

Features and advantages of the present invention will become apparent from the following description of embodiments thereof, by way of example only, with reference to the accompanying drawings, in which.

DETAILED DESCRIPTION

Compression ratio is the ratio of the internal diameter d of the helical to the external diameter of the cable held by the helical. As the internal diameter of the helical is reduced, for a constant external diameter the conductor, the compression ratio is reduced for a tighter grip.

Figure 10:
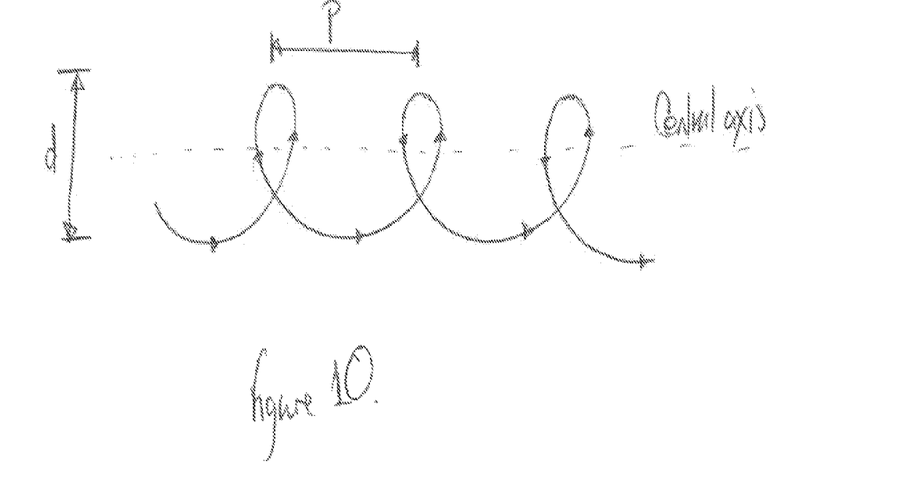
FIG. 10 illustrates the dimensions of a helical.

The parameters of pitch and diameter of a helical are illustrated in FIG. 10. Pitch is the length along the central axis of the helical for a single full turn of the helical and represented by length P. The internal diameter of the helical is represented by d. The gripping force applied by the helical onto a conductor is related to the pitch length. The shorter the pitch, the tighter the conductor is held.

In the following described embodiments, parameters, particularly pitch (and in embodiments also compression ratio) are varied to apply strength or protection where needed for the particular application. The shorter pitch holds the conductor tighter and does the mechanical work required of such a support apparatus with less material than if a longer pitch (therefore less force on the conductor) were to be used. The shorter pitch helical is more difficult to apply to a conductor, however. Further, the sharp change from the conductor being held tightly to the conductor being held not tightly can give rise to a stress area within the conductor which can result in failure. In embodiments, pitch (and/or compression ratio) are changed gradually from short to longer (and vice versa) in order to reduce the potential for stress areas arising in the conductor.

The amount of material to be used in a helical can therefore be reduced by using tighter pitches, but stress and failure can be avoided by gradually changing the pitch. Having a longer pitch can also facilitate application of the support apparatus helical to the conductor. Compression ratio can be varied with the pitch. Helicals can also be designed where pitch is not varied, but the compression ratio only is varied by varying the internal diameter of the helical.

In embodiments, the pitch and/or compression ratio may be varied a plurality of times along the helical rod to apply strength and protection where it is needed and also to facilitate installation of the rod. The pitch and/or compression ratio is gradually changed so that there is a gradual change of mechanical load to avoid stress areas.

In embodiments, the pitch and/or compression ratio may be changed along the rod so that there is a region of relatively constant pitch and/or compression ratio, then a gradual change to another region of relatively constant pitch and/or compression ratio (different from the first pitch and or/compression ratio), and then a further gradual change to another region, and so on. In other embodiments, the change of pitch and/or compression ratio may be a continuous gradual change along the rod.

In embodiments, key parameters which affect performance of a support apparatus in the form of a helical rod, particularly pitch and compression ratio, are varied. They are not changed abruptly, but changed to optimise the use of the material depending on what position on the rod they are at. This can minimise the consumption of raw materials used and also minimise the likelihood of stress risers in the conductor when implemented, whilst also making the installation easier for the installer. In certain embodiments the change of pitch between regions of relatively constant pitches occurs over about half a pitch length. In further embodiments this change can occur over several pitch lengths or less than half a pitch length.

Throughout this document 'conductor' is used to refer to the supported material. The conductor may or may not be insulated.

Figure 1:
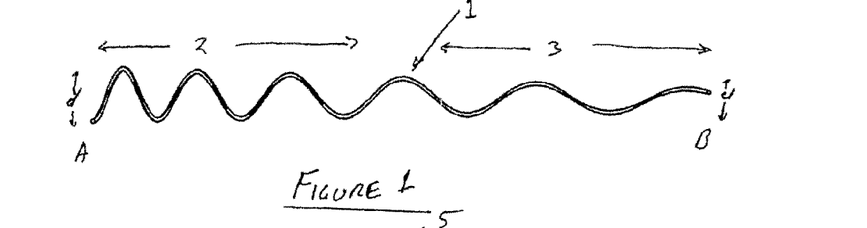
FIGS. 1 to 5 are illustrations of various embodiments of helical support apparatus in accordance with the present invention.

FIG. 1 shows a support apparatus in accordance with an embodiment of the present invention. The support apparatus comprises a helical rod 1 which, in use, may be applied to support an electrical transmission line conductor. The helical rod 1 comprises a region of relatively shorter pitch 2, transitioning into a region of relatively longer pitch 3. The transition occurs in gradual stages.

In this embodiment, the internal diameter d also changes along the length of the helical 1. The diameter d is greatest at the region 2 of shorter pitch and least at the region 3 of longer pitch. A smaller internal diameter results in a helical holding a conductor tighter. It results in a smaller compression ratio, which means greater tightness on the conductor.

In this embodiment, the shorter pitch has a compression ratio less than one (so even when d is at its greatest it is still less than the diameter of the conductor to which the helical is to be applied) results in a firmer hold on the conductor in the region 2 than in the region 3. The region 3 still provides a relatively firm hold by virtue of the reduced diameter, but is designed not to provide as strong a hold on the conductor as the region 2.

This helical can be used in applications where a conductor needs to be held and protected tightly at one region and not so at another region (corresponding to region 3). Because the pitch and compression ratio change gradually, this reduces the chance of stress arising in the conductor being held. Further, the region 3 can be used as a lever to apply the helical to the conductor, starting at end A, by applying the shorter pitch coils to the conductor first and finishing at end B.

Figures 2, 3:
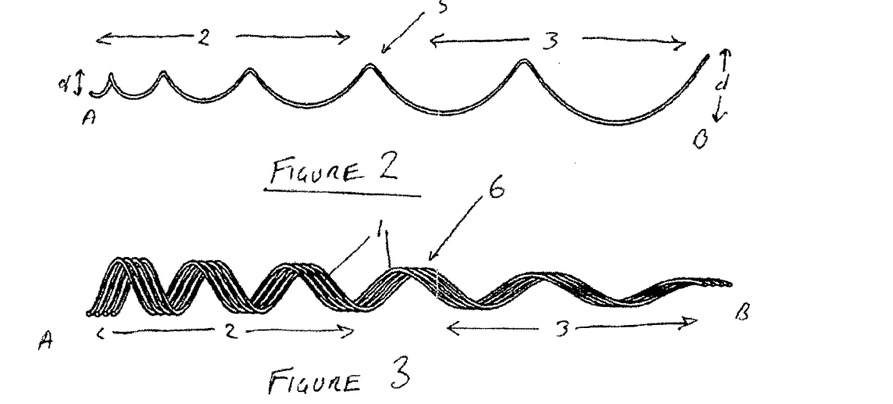

FIG. 2 shows a further embodiment. In this embodiment, as with the embodiment of FIG. 1, there is a region 2 of shorter pitch and a region 3 of longer pitch of the helical, the pitch changing from A to B (left to right in the figure) along the length of the helical 5. In this embodiment, however, the internal diameter d of the helical 5 increases from the region 2 to the region 3. The region 2 will therefore provide much greater compression on the conductor and hold the conductor very tightly as compared with the region 3 (particularly the region 2 towards the end A will be very tight). FIG. 3 illustrates a support apparatus 6 which comprises three helical rods of the embodiment of FIG. 1 nested together as a set. It is known to use sets of helical rods to form support apparatus. In this embodiment, using a set increases protection and support of the conductor to which the set is applied. In this embodiment, because of the variation of the parameters of the helicals 1 along the length, a significant reduction in raw material is achieved (this embodiment may use only 60 percent of raw material of a conventional rod whose parameters are not varied). Further, application by a linesman is easier because of the leverage provided by the region of longer pitch 3. This results in a significant saving of raw material and a device which provides protection and support at least the same if not better than a conventional device where no parameters are varied.

Figure 4:
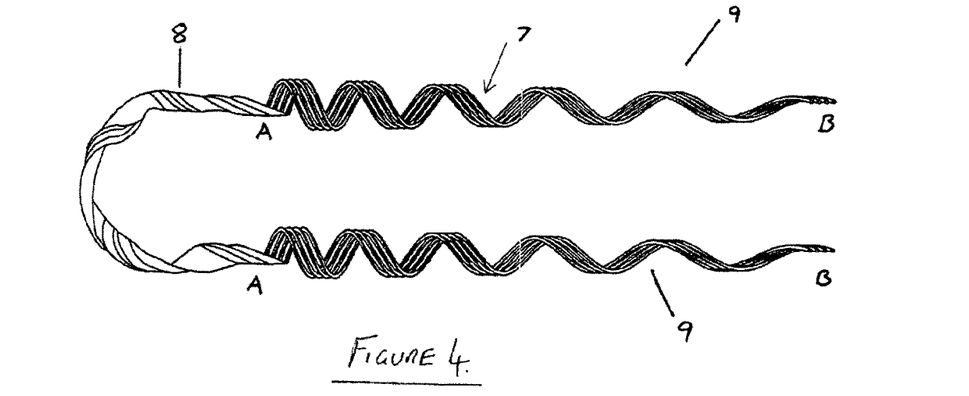
Figure 8:
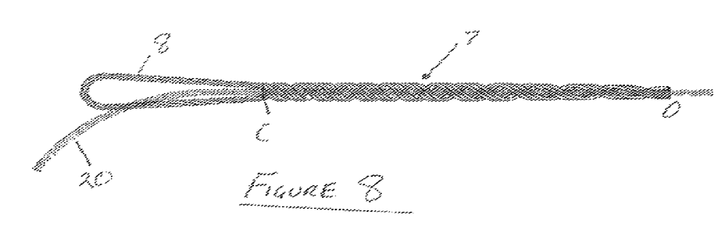
FIG. 8 is an illustration in use of a helical dead-end in accordance with an embodiment of the present invention.

FIG. 4 shows a support apparatus in the form of a helical dead-end. In FIG. 4, the dead-end is shown unapplied to a conductor. FIG. 8 shows the dead-end 7 applied to a conductor 20.

A dead-end is used to support an unbalanced mechanical load. The loop 8 of the dead-end is usually attached to a mechanical support (such as a power pole) to support the weight of a conductor. The helical portion 9 of the dead-end wraps around the conductor to grip it and support it.

In this embodiment, the dead-end 7 comprises a set of helicals similar to the embodiment of FIG. 1 and FIG. 3 joined at the tighter pitch end A of each helical by a loop 8, continuing as part of the helical material. As shown in FIG. 8 the loop 8 may be formed from the ends of the helical rods twisted together.

In this embodiment, the pitch is controlled to be smallest near the crossover point C (where the helical starts to form the loop) and longest at the end D of the fitting furthest away from the loop 8. The conductor 20 is therefore held and protected most tightly towards the end C closest to the loop and less tightly toward the end D. This allows the dead-end 8 to be fitted easily using the leverage of the longer pitch end of the helical set whilst still providing good holding strength and protection. This reduces the amount of raw material required as compared with a conventional helical dead-end, due to the longer pitch length in regions in which tight gripping is less important, and increases performance qualities.

In this embodiment, the compression ratio changes from A to B (FIG. 4) to reduce (typically from 0.9 to 0.77) so that the conductor is still held relatively tightly towards the end B (D in FIG. 8). In other applications, the compression ratio might be lower at the end C and get higher (i.e. it might change from 0.77 to 0.9) towards D. In further embodiments the compression ratio does not need to change at all.

The pitch and compression ratio do not change suddenly, but change gradually in order to optimise properties and minimise the likelihood of stress risers.

Figure 5:
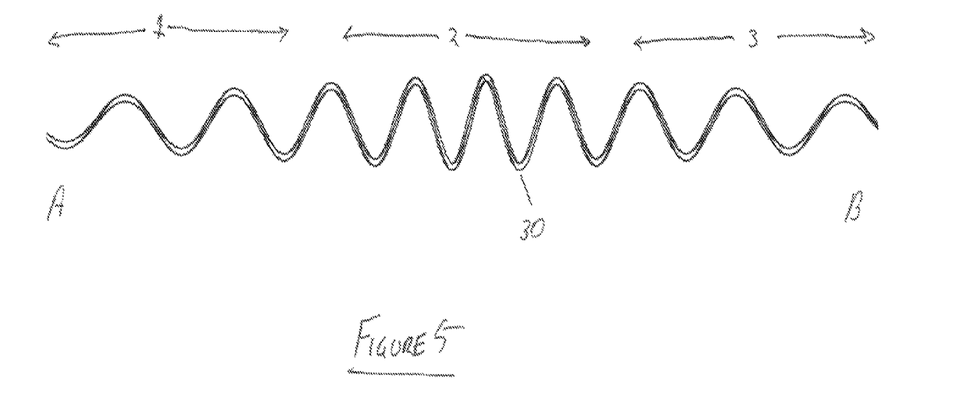
Figure 7:
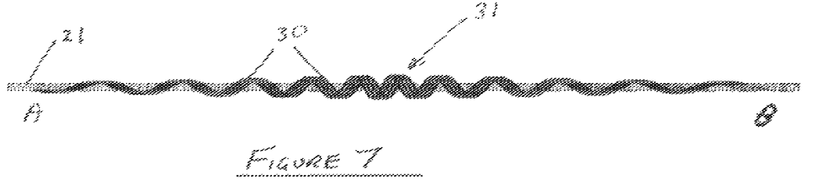
FIG. 7 is an illustration in use of a helical splice in accordance with a further embodiment of the present invention.

FIGS. 5 and 7 illustrate an embodiment of the present invention that may be applied as an armour rod. Armour rods are utilised to protect and support electrical transmission conductors in the area where they are suspended or otherwise supported by a power pole or tower. If a heavy conductor were suspended directly from the power pole without any protection, it would tend to "kink" and stress would occur at the point of suspension, which could lead to failure of the conductor. Armour rods are being used to support the conductor in this area and spread the stress over the conductor, as well as protecting the conductor. As discussed above, conventional armour rods have even pitch and compression ratio along their length.

FIG. 5 illustrates a helical rod 30 which may be suitable for use in an armour rod application.

In this embodiment, the pitch and compression ratio of the helical rods vary along the length of the helical rod. From end A to B (left to right in the figure), both pitch and the diameter (which affects compression ratio) vary. At A the pitch starts off relatively longer, changes to relatively shorter and then goes to relatively longer again towards B. Similarly, the diameter starts off lower, gets larger, and then goes smaller at B.

There can be considered to be three regions 1, 2, and 3. Region 1 is a region of shorter diameter and longer pitch, region 2 shorter pitch, longer diameter and region 3 back to longer pitch and diameter. The properties of region 2 therefore include the ability to tightly hold the conductor. This is important at the centre of the armour rod where the conductor is to be suspended. The property is then gradually changed towards the regions 1 and 3, where the conductor can now be held slightly less tightly. A linesman would be able to install the armour rod from the centre outwards, using leverage provided by the longer pitch regions. Less material is required for this application then for a conventional armour rod. A gradual change of properties reduces stress points on the conductor.

Referring to FIG. 7, a set of helicals 30 is shown forming an armour rod 31 in place about a conductor 21. In this embodiment, the count of rods in the set of helicals numbers three. There may be more or less than this.

In a further embodiment of an armour rod (not shown) there could be five regions. The regions would be relatively long pitch, then short, then long, then short and then long. In this embodiment the centre long region matches the shape of the suspension fitting. Compression ratio may also be varied.

Figure 6:
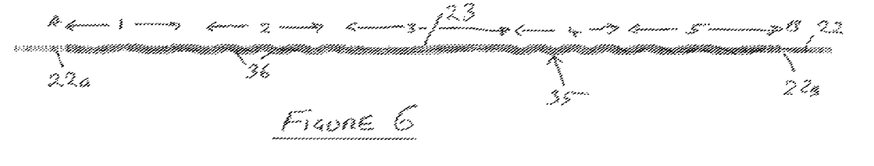
FIG. 6 is an illustration of a helical splice apparatus in accordance with an embodiment of the present invention, shown in use.

A further application of an embodiment of the present invention is illustrated in FIG. 6. This shows application as a splice over a conductor 22. The conductor 22 is two conductors 22a and 22b, which are joined by abutting their ends at 23 (at the centre of the drawing).

Conductor splices are commonly used to join electrical transmission and distribution conductors. A set of helicals are usually used to form a splice for supporting and maintaining the join of the conductor. Conventional splice helicals have constant pitch and compression ratio.

In this embodiment, the helicals 36 vary in at least pitch length from left to right (A to B) along the helical, to form essentially five regions. Region 1 is a region of relatively long pitch, region 2 shorter pitch, and region 3 longer pitch, region 4 shorter pitch, region longer pitch.

There are therefore an array of pitch regions forming the splice. The applicants have found that if there is a tight portion (e.g. shorter pitch) where the conductor join occurs, this can actually force the conductor join apart. There is therefore a relatively long pitch in this region 3, and shorter pitches 2 and 4 either side of this region, in order to maintain the join 23 together. Again, we have the advantages here of this embodiment allowing force to be applied on the conductor where it is needed and where it is more appropriate, whilst still protecting the conductor, maintaining the splice functionality, allowing for ease of installation, and saving on raw material as compared with conventional splices.

The five region helical having regions of relatively long pitch at the ends and in the centre, separated by region of relatively shorter pitch, as depicted in FIG. 6, is particularly advantageous as it is suitable for use as a splice (as demonstrated in FIG. 6) and a dead-end. When used as a dead-end, the central region of the helical, having relatively longer pitch, is used in the loop of the dead-end (for example 8 in FIG. 8).

The regions of tighter pitch grip the conductor tighter at the end of the loop and the regions of longer pitch furthest from the loop provide support for the conductor but grip less tightly.

The five region helical is beneficial in uses as both a dead-end and a splice since it grips tightly where necessary and provides support where necessary. Efficient use of material is also provided by the longer pitch regions. In some embodiments, the regions between the long and short pitch regions are around half a pitch length. In further embodiments the regions may be shorter than half a pitch length or longer than half a pitch length.

Embodiments of the present invention can use any number of variations in regions to apply the appropriate support and protection for any particular application. Five regions are shown in the splice application of FIG. 6, but more regions than this or less may be used.

Figure 9:
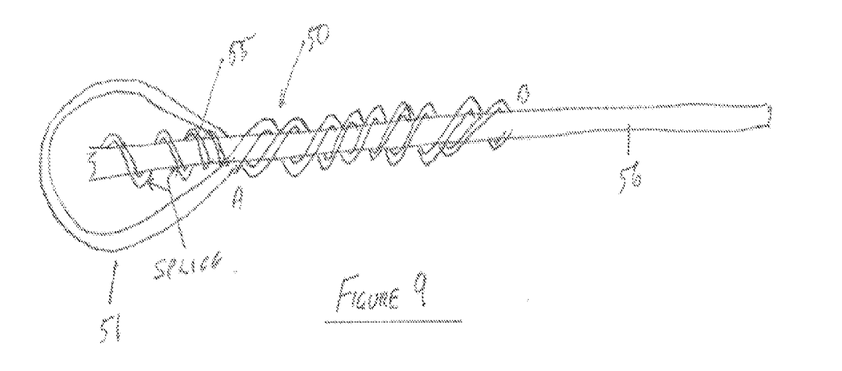
FIG. 9 is an illustration of a further embodiment of the present invention comprising a helical dead-end and a wedge device.

In other embodiments, further devices to facilitate the function of a support apparatus such as a helical are utilised together with the support apparatus. In an embodiment, these further devices may provide a wedge function. In an embodiment, the wedge device (further device) may in fact be a further helical. An example will now be described with reference to FIG. 9. FIG. 9 shows a helical dead-end in accordance with the earlier embodiment of the invention. The pitch of the helicals of the dead-end increases from the loop 51 end to the end B (the loop 51 end is A of the dead-end device 50). In order to further enhance the grip at the loop end A, a short helical 55 (termed splice) here is wrapped around the conductor 56 before application of the dead-end 50. The dead-end 50 is then applied over a portion of the splice 55 (in the area A). When the dead-end is implemented and the loop 51 supports the dead-end 50 and conductor 56, the helix of the dead-end 50 tends to tighten around the splice 55. The force on the conductor 56 at the part A is therefore greater than it would be without the splice. This facilitates the functionality of the dead-end 50. It may enable even less material to be used in the dead-end 50 then in embodiments described above, and still provide similar or even better functionality.

A further device, such as a wedge device, may be used with conventional helicals, and not only with helicals in accordance with embodiments of the present invention as described above.

Further wedge type devices can be used with any type of application, not just limited to a dead-end. It could be used with conventional helicals, or helicals in accordance with embodiments as described above.

Helicals in accordance with embodiments of the present invention may be manufactured in a number of ways.

The applicants have implemented a particularly useful way of manufacturing helicals in accordance with the present invention, using a numerically controlled spring making machine. Using these readily available machines, helicals can be formed in which all of the parameters can be varied simultaneously to optimise the design. In particular, pitch and/or compression ratio can be there using these spring making machines.

The use of a numerically controlled spring making machine to manufacture fittings will allow gradual and non-symmetrical changes to occur to the pitch angle and pitch length and the compression ratio. Alternatively, this can be performed using a rotating mandrel with a varying feed rate.

An alternative method of manufacture is to first of all tightly wind a helical then unwind and push and pull according to the speed of unwinding to vary the pitch.

EXAMPLE

An armour rod is formed such that at the centre of the splice there are a few pitches that are a very tight pitch (may be in the order of 40 mm gradually changing). Towards the ends the pitch gradually increases to the order of 100 mm. It will be appreciated that these numbers are only an example and the invention is not limited to this. Simultaneously compression ratio may reduce from 90 percent towards the centre to 77 to 80 percent at the end of the helical. Alternatively, depending on the specific requirements of the design, the compression ratio might grow from 77 to 80 percent at the centre of the helical to 90 percent at the end of the helical. In the case of the splice joining two conductors of different diameters, the pitch and compression ratio might alternate gradually between tight pitch and low compression ratio to long pitch and high compression ratio and then back again to a tighter, but not necessarily identical pitch into a low, but not necessarily identical compression ratio at the other end. The use of very tight pitch can reduce or eliminate the need for abrasive grit. This may mean that the cost of gritting can be reduced where appropriate and grit applied in a gradually increasing amount where the pitch is longer.

Embodiments of the present invention are not limited to use with transmission conductors and cables, but may be used with any conductor or cable.

In the above embodiments, pitch and compression ratio are generally varied together. It will be appreciated, that in some embodiments only pitch may be varied. In others only compression ratio may be varied. Further, in other embodiments, other of the parameters discussed above may be varied, either singly or together.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It will be clear to persons skilled in the art that the helicals described above are suitable for supporting any type of conductor. While embodiments above relate to electrical conductors, it will be appreciated that optical conductors, for example optical fibres, or any other conductor could be supported. The examples above are not limiting to the scope of the invention.

What is claimed is:
1. A supporting apparatus for a conductor, comprising:
   a helical manufactured with a plurality of turns arranged for gripping the conductor, wherein:

a pitch between the plurality of turns vary along a length of the helical from a region of longer pitch at an end of the helical to a region of shorter pitch along the helical, an internal diameter of the plurality of turns in the region of longer pitch is less than an internal diameter of the plurality of turns in the region of shorter pitch, and the varying pitch and the varying internal diameter of the plurality of turns results in variations in gripping force along the helical when applied to the conductor.

2. The supporting apparatus in accordance with claim 1, wherein the pitch of the plurality of turns varies along the helical from the region of longer pitch, to the region of shorter pitch, to a second region of longer pitch.

3. The supporting apparatus in accordance with claim 1, wherein:

the helical has four or more regions of pitch, and the pitch varies from the region of longer pitch, to the region of shorter pitch, to a second region of longer pitch, to a second region of shorter pitch.

4. The supporting apparatus in accordance with claim 1, wherein:

the helical has five or more regions of pitch, and the pitch varies from the region of longer pitch, to the region of shorter pitch, to a second region of longer pitch, to a second region of shorter pitch, to a third region of longer pitch.

5. The supporting apparatus in accordance with claim 3, wherein:

the region of longer pitch and the second region of longer pitch have a first pitch and the region of shorter pitch and the second region of shorter pitch have a second pitch, and the first pitch is greater than the second pitch.

6. The supporting apparatus in accordance with claim 1, wherein:

a transition region is located between the region of longer pitch and the region of shorter pitch, and a transitional pitch within the transition region varies from a pitch of the region of shorter pitch to a pitch of the region of longer pitch.

7. The supporting apparatus in accordance with claim 1, wherein the helical is a helical dead-end, armour rod, conductor splice, spacer, top tie, or side tie.

8. The supporting apparatus in accordance with claim 1, wherein two or more of the following parameters are varied over the length of the helical: hardness of a raw material of the helical; pitch angle; or length of pitch.

* * * * *